(12) United States Patent
White

(10) Patent No.: US 11,973,896 B2
(45) Date of Patent: Apr. 30, 2024

(54) INVISIBLE INTERCOM AND ACCESS SYSTEM AND METHOD

(71) Applicant: David Joel White, Woodbridge (VA)

(72) Inventor: David Joel White, Woodbridge (VA)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 17/501,170

(22) Filed: Oct. 14, 2021

(65) Prior Publication Data

US 2022/0124203 A1 Apr. 21, 2022

Related U.S. Application Data

(60) Provisional application No. 63/092,585, filed on Oct. 16, 2020.

(51) Int. Cl.
*H04M 11/02* (2006.01)
*H04M 3/42* (2006.01)
*H04M 3/56* (2006.01)

(52) U.S. Cl.
CPC ..... *H04M 11/025* (2013.01); *H04M 3/42382* (2013.01); *H04M 3/566* (2013.01); *H04M 2203/6081* (2013.01)

(58) Field of Classification Search
None
See application file for complete search history.

(56) References Cited

U.S. PATENT DOCUMENTS 8,923,919 B2 12/2014 Fan et al.
9,425,981 B2 8/2016 Foster
(Continued)

FOREIGN PATENT DOCUMENTS

CN 201887844 6/2011
CN 104281200 1/2015
(Continued)

OTHER PUBLICATIONS

Touchless Access Control and Video Intercom System; https:/www.swiftlane.com; pp. 1-15; Oct. 21, 2020.
(Continued)

*Primary Examiner* — Hemant S Patel
(74) *Attorney, Agent, or Firm* — KED & ASSOCIATES

(57) ABSTRACT

An invisible intercom and access system and method. The invisible intercom and access system may include a visitor device configured to make a phone call to a specific phone number; one or more authorized point of contact (APoC) device configured to receive the phone call and having an input configured to receive a code that produces tones; one or more third party device configured to control access to one or more access point of a property or building; and an invisible intercom and access apparatus configured to receive the phone call from the visitor device and connect the phone call to the one or more APoC device, recognize the tones of the code input at the one or more APoC device, and control or send a control signal to the one or more third party device. The invisible intercom and access method may include receiving via an invisible intercom and access apparatus a phone call from a visitor device using a specific phone number provided to a visitor at one or more access point of a building or property; connecting via the invisible intercom and access apparatus the phone call to one or more APoC device; recognizing via the invisible intercom and access apparatus tones of a code input by the one or more APoC device; and controlling the one or more third party device in response to the recognizing of the tones.

21 Claims, 11 Drawing Sheets

(56) References Cited

U.S. PATENT DOCUMENTS

| | | | |
|---|---|---|---|
| 10,229,548 | B2 | 3/2019 | Daniel-Wayman et al. |
| 10,645,229 | B1 | 5/2020 | Wang |
| 2008/0106370 | A1* | 5/2008 | Perez .................... G10L 17/00 |
| | | | 340/5.84 |
| 2010/0222031 | A1* | 9/2010 | Carolan ................ G08C 17/02 |
| | | | 455/414.1 |
| 2012/0094642 | A1* | 4/2012 | Popperl ................. H04L 67/02 |
| | | | 455/415 |
| 2017/0214802 | A1* | 7/2017 | Gaspard ............. H04M 7/1295 |
| 2019/0035190 | A1 | 1/2019 | Szczygiel |
| 2020/0111274 | A1* | 4/2020 | Taylor .................. H04Q 1/457 |
| 2020/0410832 | A1* | 12/2020 | Szczygiel ............... G07C 9/29 |

FOREIGN PATENT DOCUMENTS

| | | |
|---|---|---|
| CN | 107547820 | 1/2018 |
| EP | 3 179 758 | 6/2017 |
| WO | WO 9508891 | 3/1985 |

OTHER PUBLICATIONS

A Warm Welcome to all Your Guests; https://mygate.com/visitors-management-software; pp. 1-5; Oct. 21, 2020.

Intercoms for Apartments; https://kintronics.com/products/door-access-control/ intercoms-mobile-devices; pp. 1-5; Oct. 21, 2020.

\* cited by examiner

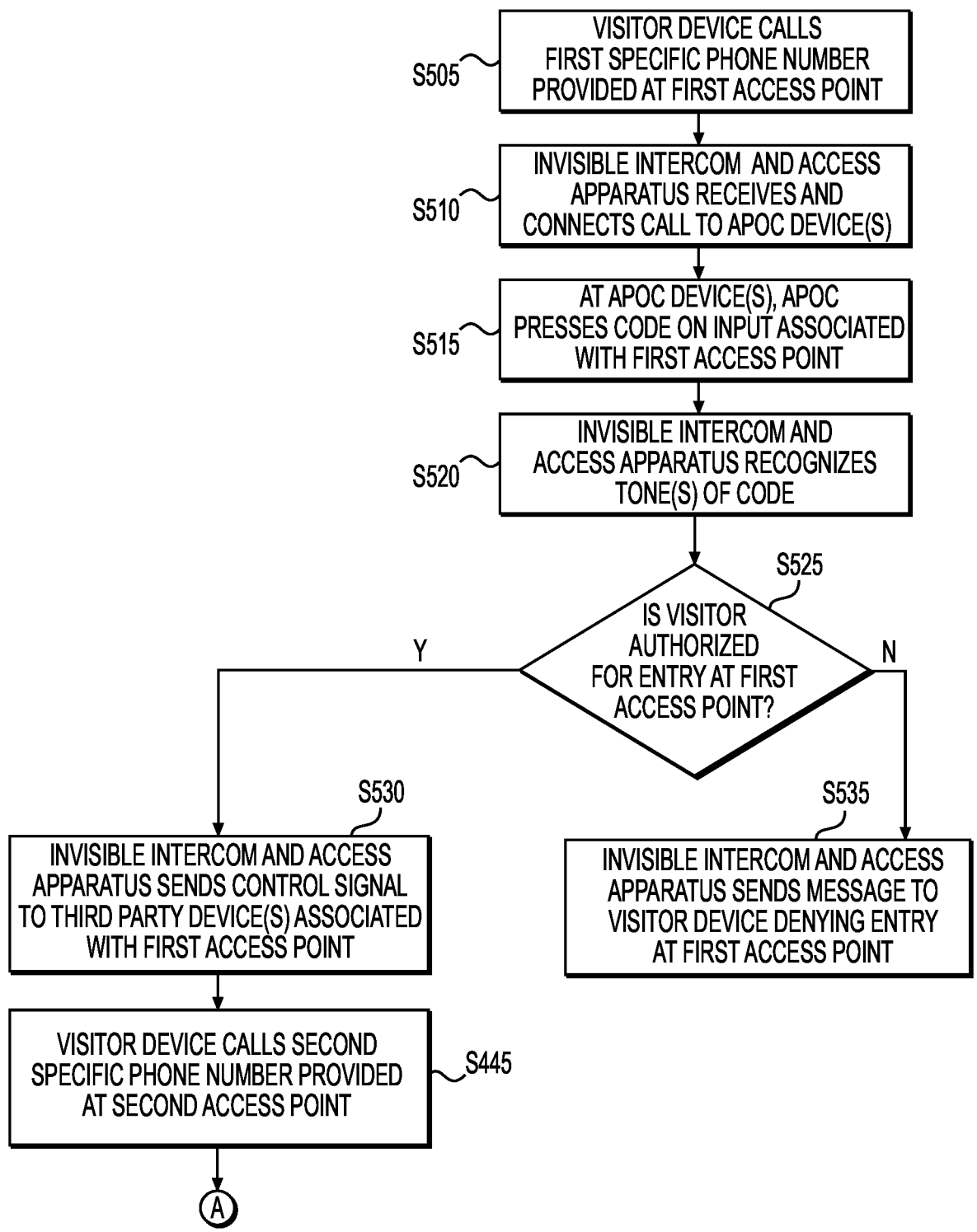

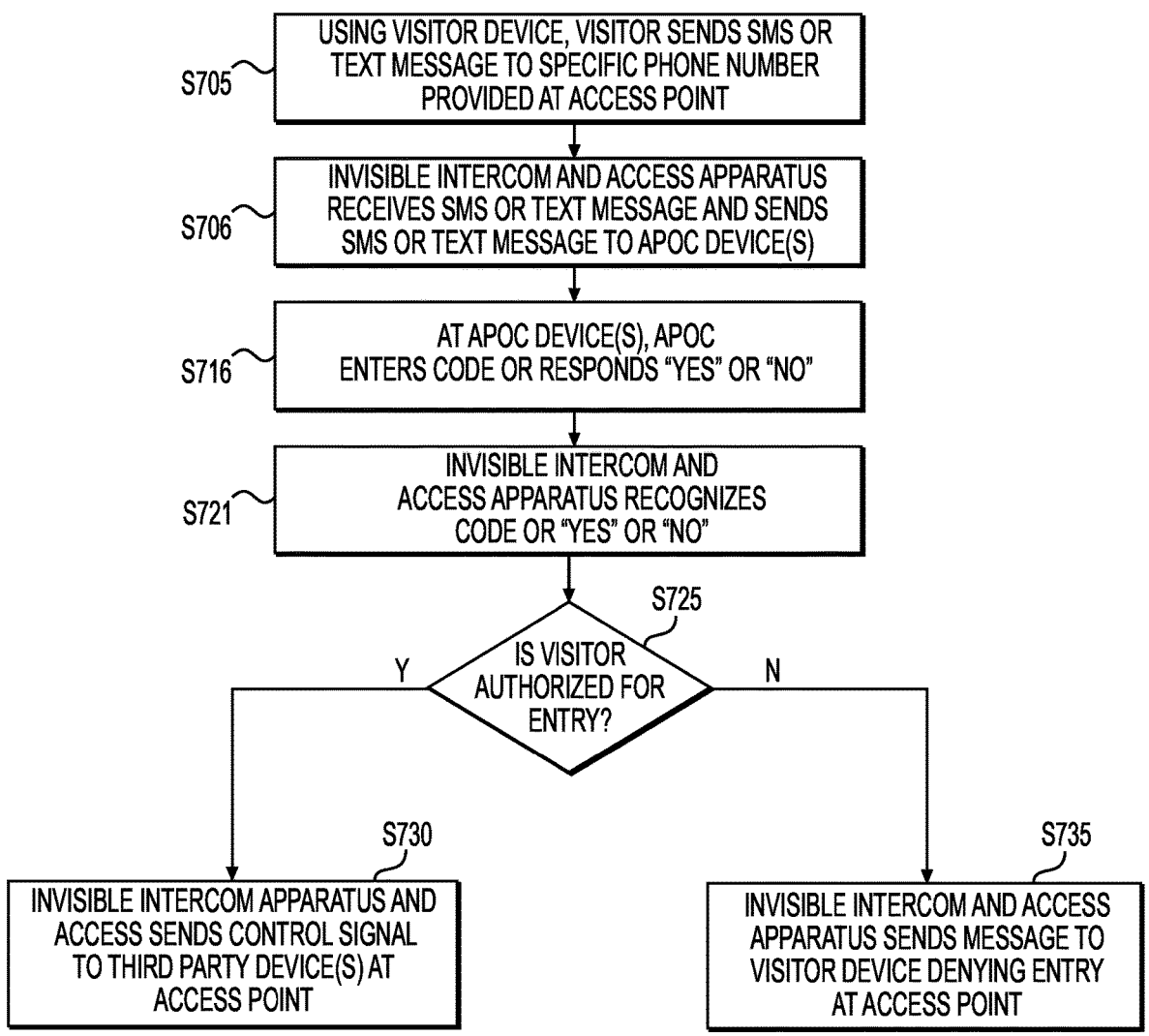

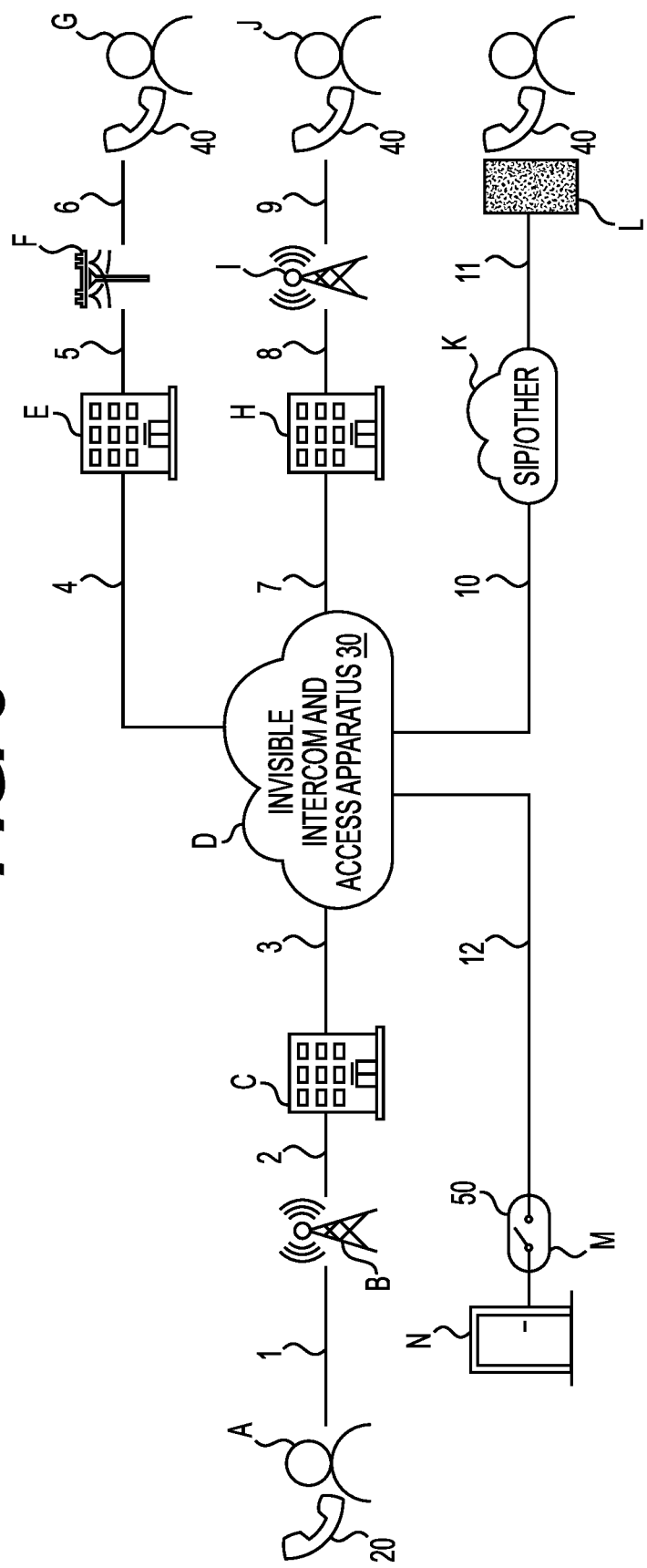

INVISIBLE INTERCOM AND ACCESS SYSTEM AND METHOD

CROSS-REFERENCE TO RELATED APPLICATION(S)

This application claims priority to U.S. Provisional Application No. 63/092,585 filed on Oct. 16, 2020, whose entire disclosure is hereby incorporated by reference.

BACKGROUND

Field

An invisible intercom and access system and method are disclosed herein.

2. BACKGROUND

Intercom systems and methods are known, but suffer from various disadvantages. For example, related art intercom systems and methods require costly infrastructure, such as phone lines and network wiring, as well as dedicated hardware, such as call boxes, physical speakers, microphones, and buttons, to initiate communication and/or activate controllable devices. More advanced intercom systems and methods require an application (hereinafter "app") to be installed on a visitor device, an authorized point of contact device, or both. Such systems and methods are complicated and costly to produce, install, and/or operate.

BRIEF DESCRIPTION OF THE DRAWINGS

Embodiments will be described with reference to the following drawings in which like reference numerals refer to like elements, and wherein:

FIG. 7 is an invisible intercom and access method according to another embodiment;

FIG. 8 is a schematic diagram illustrating an invisible intercom and access method according to an embodiment.

DETAILED DESCRIPTION

Figure 1:
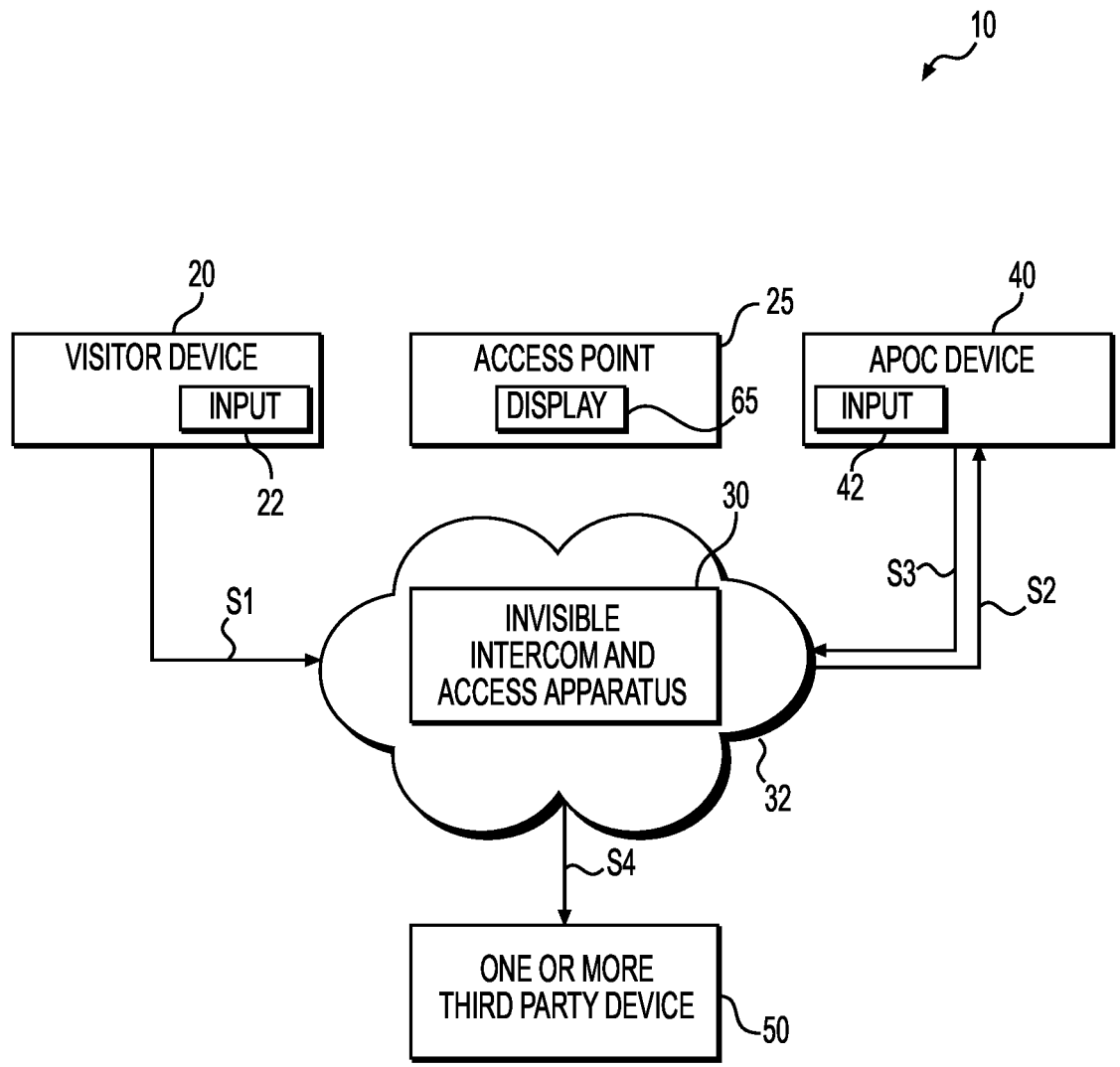
FIG. 1 is a schematic diagram of an invisible intercom and access system according to an embodiment.

An invisible intercom and access system and method according to embodiments will be described hereinafter. The invisible intercom and access system and method according to embodiments provide a way to allow a visitor entry to any access point on any type of building or property by initiating a phone call from a visitor device, such as a mobile phone, to an authorized point of contact (APoC) device, that is, a device of a person or authorized point of contact (APoC) authorized to allow entry into the building or property, all without the need for the visitor to utilize anything beyond his or her mobile phone, for example, no physical "call box", and no special phone application ("app"), just using a designated or specific phone number.

Various embodiments of an invisible intercom and access system and method are disclosed hereinafter. It is noted that any of the various embodiments of an invisible intercom and access system and method disclosed hereinafter may utilize various components and/or functions and/or operations interchangeably. Further, the same or like reference numerals are utilized to indicate the same or like components, and repetitive disclosure has been omitted.

Figure 2:
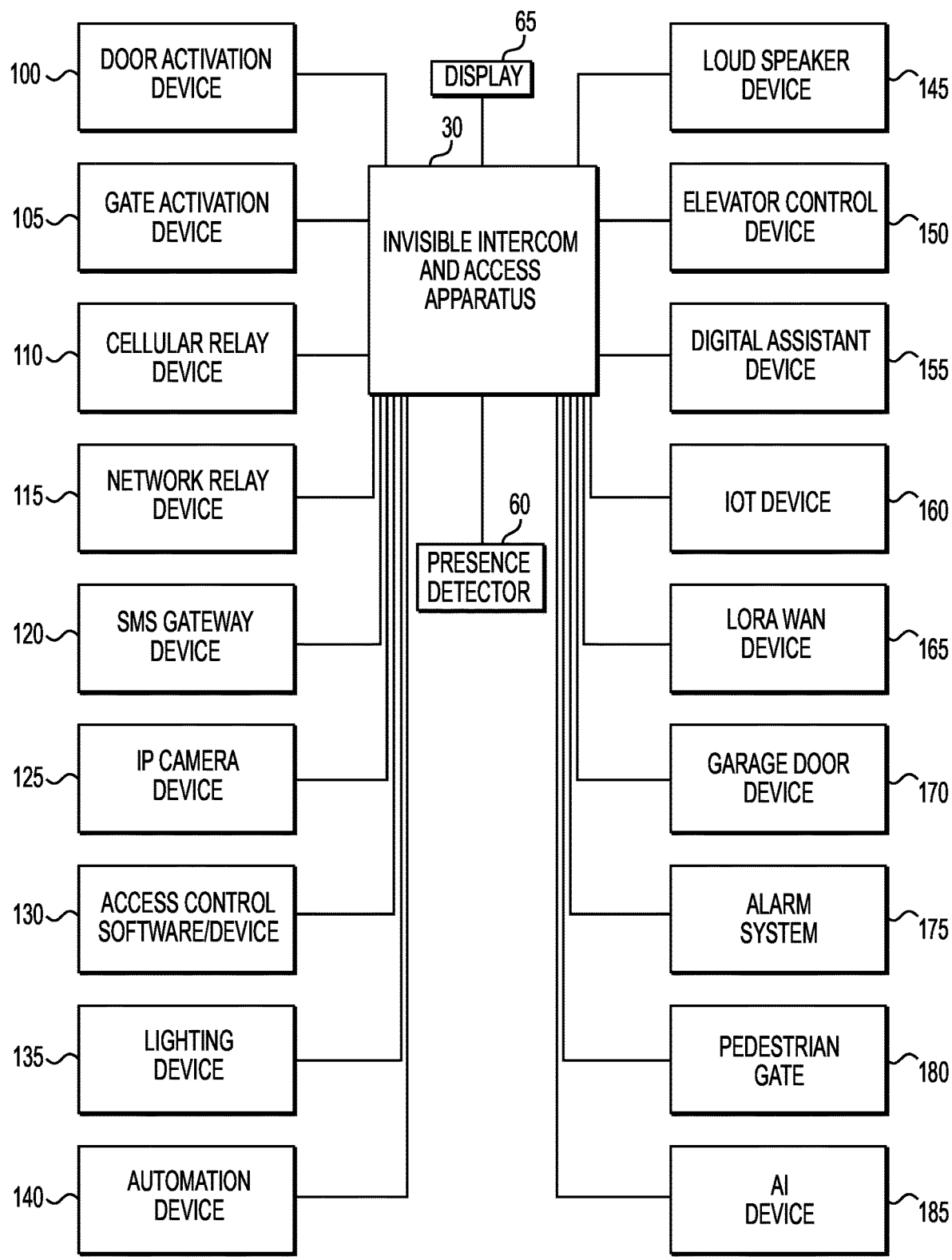
FIG. 2 is a schematic diagram illustrating communication between an invisible intercom and access apparatus and a display, a presence sensor, and various third party devices according to embodiments.
Figure 3:
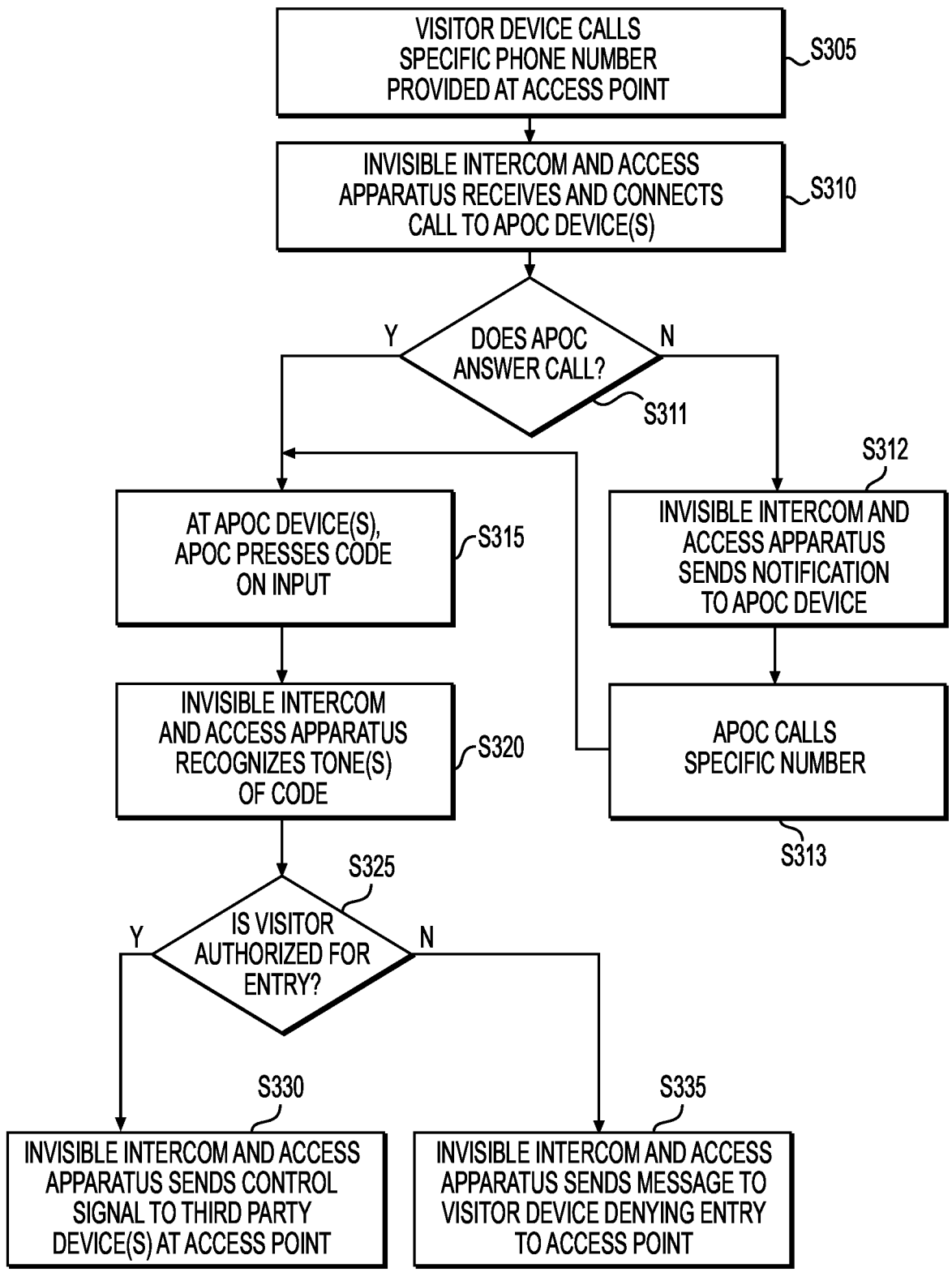
FIG. 3 is an invisible intercom and access method according to an embodiment.
Figure 4:
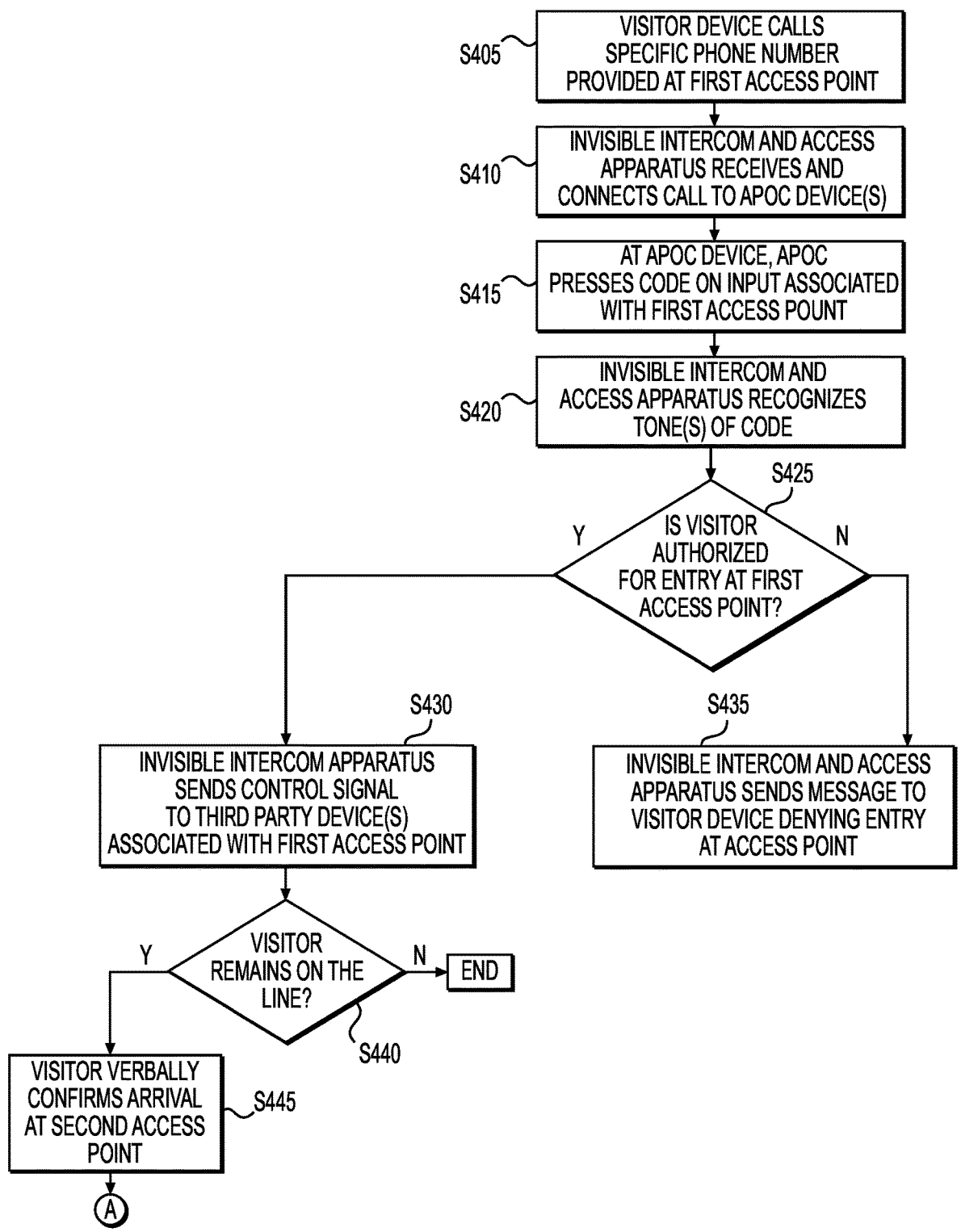
FIG. 4 is an invisible intercom and access method according to another embodiment.
Figure 4:
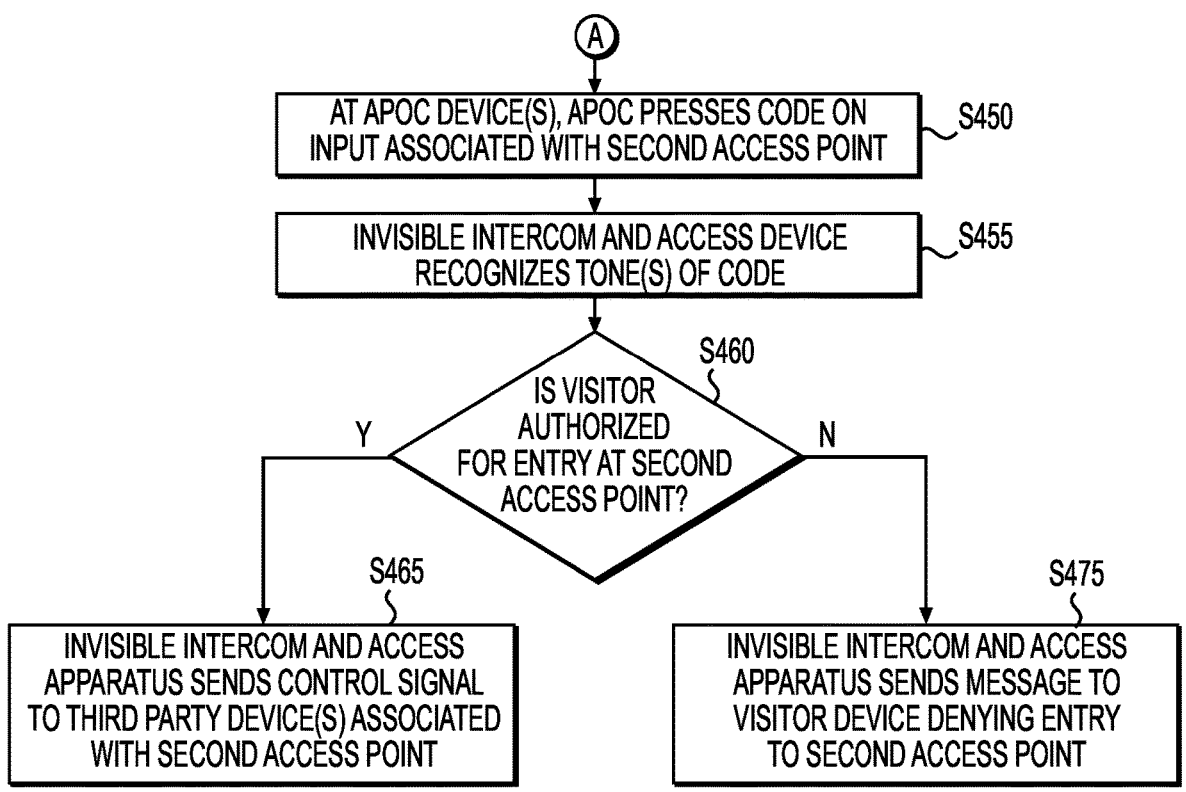
Figure 5:
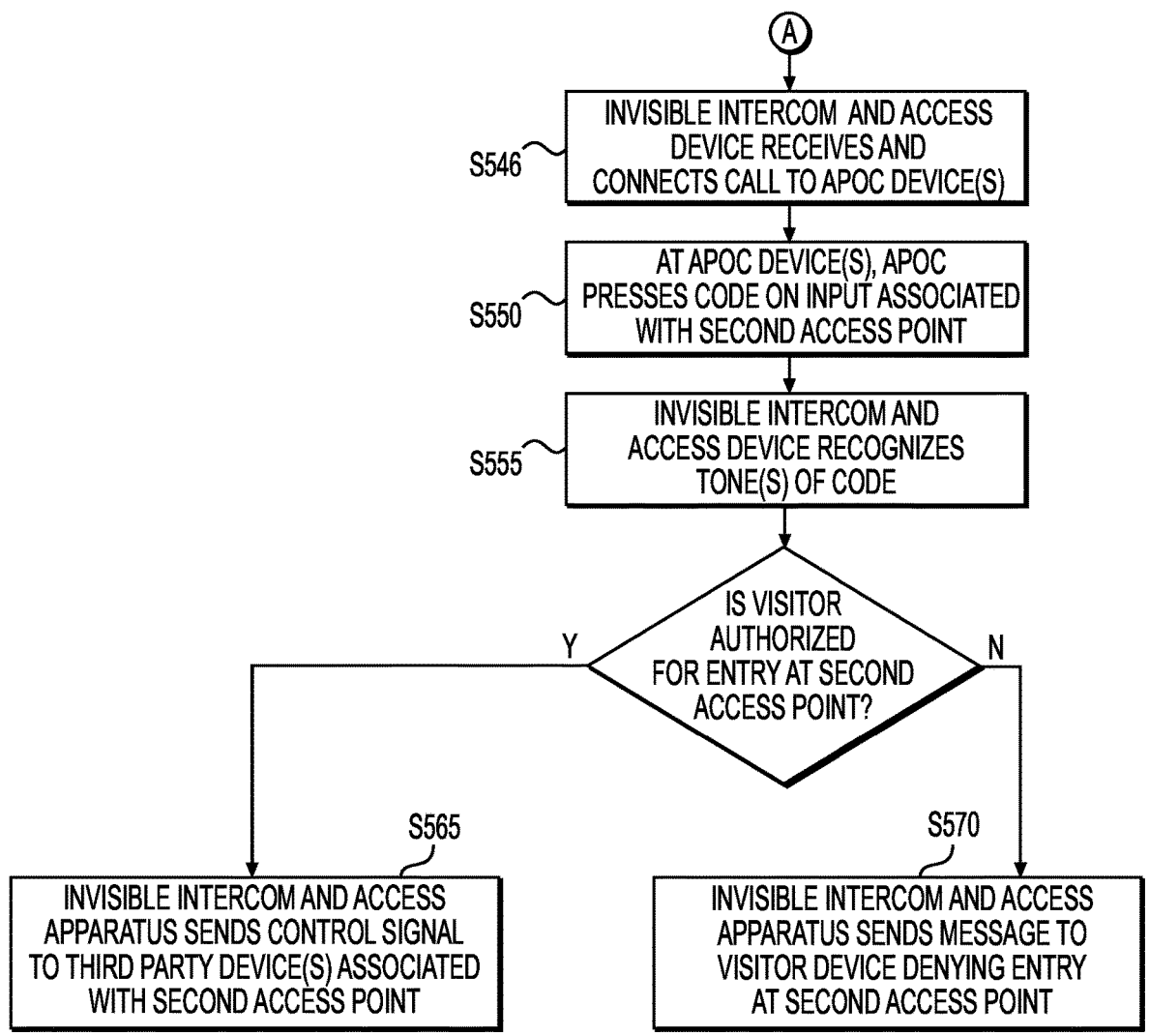
FIG. 5 is an invisible intercom and access method according to another embodiment.
Figure 6:
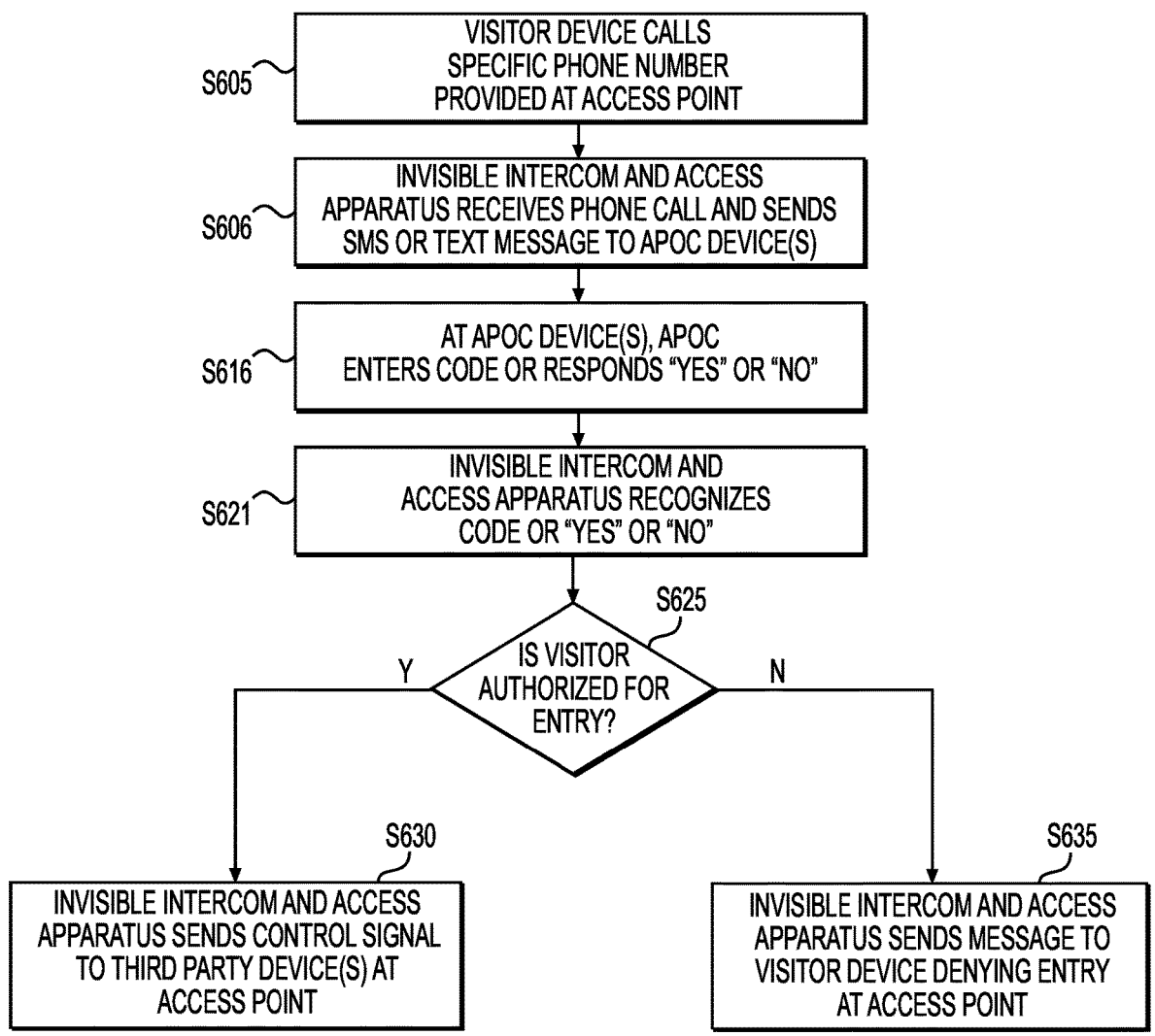
FIG. 6 is an invisible intercom and access method according to another embodiment.

FIG. 1 is a schematic diagram of an invisible intercom and access system according to an embodiment. FIG. 2 is a schematic diagram illustrating communication between an invisible intercom and access apparatus and a display, presence sensor, and various third party devices according to embodiments. FIG. 3 is an invisible intercom and access method according to an embodiment. FIG. 4 is an invisible intercom and access method according to another embodiment. FIG. 5 is an invisible intercom and access method according to another embodiment. FIG. 6 is an invisible intercom and access method according to another embodiment. FIG. 7 is an invisible intercom and access method according to another embodiment.

Invisible intercom and access system 10 of FIG. 1 may include a visitor device 20. The visitor device 20 may be any device capable of calling a designated or specific phone number via an input 22, such as a keypad or touch pad. For example, the visitor device 20 may be a mobile phone.

A visitor may arrive at one or more access point 25 of a building or property, for example, on foot, on a bicycle or motorcycle, or in a vehicle or other mode of transportation, and then may call the designated or specific phone number using his or her mobile phone. When the visitor arrives in a vehicle, the visitor may remain fully secured within the vehicle while contact is made with one or more APoC, thus, eliminating the requirement to roll down the window.

A designated or specific phone number may be provided. The specific number may be associated with a specific access point, such as a gate or door or other access point of a building or property, for example. Alternatively, the specific number may be associated with a specific set of access points, for example, a gate, door, or other access point of a building or property. Alternatively, the specific number may be associated with a specific entire building or property, or multiple properties. For example, each specific access point of a building or property may have a different phone number, identifying for the system the particular access point, or one phone number may be provided at an initial access point of a building or property, and a visitor may stay on the line as they are guided through and provided access through multiple access points of the building or property, such as a front gate and then front door, a front gate and then secondary gates, a front door and then secondary doors, or a garage door of a building and then a door of the building, for example.

The specific phone number may be provided at the one or more access point 25 of a building or property, such as a gate or a door. For example, the specific phone number may be provided on a display 65. The display 65 may be a sign posted at the access point 25 of the building or property. Alternatively, the display may be a sign at or on a gate or door or other access point; a sign on a column at a gate or door or other access point; a pedestal with a sign on it at a gate or door or other access point; a pedestal with a housing at a gate or door or other access point, similar to a call box but instead of having a button, it has a sign; a sign with a Quick Response (QR) code, which may be scanned using the visitor device 20 to automatically prompt visitor device 20 to input the specific number; a hologram or projector at a gate or door or other access point; a light emitting diode (LED) or digital sign at a gate or door or other access point; or a small monitor at a gate or door or other access point. Alternatively, the specific phone number may be provided in a text message from an APoC to a visitor/visitor device; in an email from the user to a visitor/visitor device; in a text message from a user portal to a visitor/visitor device; in an email from the user portal to a visitor/visitor device; in response to detection of a visitor by a motion or presence sensor; with an audible message including instructions; with a Bluetooth broadcasting prompt to a visitor device within range; or to activate a sign device so that a message is only displayed when a visitor has activated the motion or presence sensor. However, these are merely examples, and embodiments are not limited thereto.

The APoC may use a user portal for programming the system, editing system changes, and/or viewing event logs, for example. The user portal may be a website that an administrative level authorized point of contact may log into to make changes appropriate to his/her site or system. Within the user portal, a command center may allow the APoC to control access points without requiring a phone call from a visitor, for example, to hold a gate open for a snowplow.

The invisible intercom and access system 10 may further include one or more APoC device(s) 40. The one or more APoC device(s) 40 may be any device capable of receiving a phone call and pressing numbers on an input 42, such as a dial, a keypad, a touch pad, or clickable button, for example. For example, the one or more APoC device may be a mobile phone, a landline phone, a Voice over Internet Protocol (VoIP) phone, a Session Initiation Protocol (SIP) or WebRTC softphone, or a mobile application ("app"); however, these are merely examples, and embodiments are not limited thereto.

The invisible intercom and access system 10 may further include an invisible intercom and access apparatus 30. The invisible intercom and access apparatus 30 is a customized hybrid private branch exchange (PBX) configured to receive a phone call (51) from visitor device 20, connect the phone call (S2) to one or more APoC device 40, recognize a code, that is, a code that produces a tone or tones (hereinafter, collectively "tones") (S3), input into the one or more APoC device 40 by an APoC, and control or send a control signal (S4) to one or more third party device 50 based on the recognized tones (S3). The tones may be tones indicating that the visitor is authorized for entry or indicating that the visitor is not authorized for entry. Alternatively, if the APoC device is more advanced, it may utilize a form of network protocol message to produce the same desired command function to the invisible intercom and access apparatus, such as a soft button.

The code may be a number or a series of numbers, such as "1", input at input 42 of the one or more APoC device 40. The input number or series of numbers creates a tone or tones using dual-tone multi-frequency signaling (DTMF), which are recognized by the invisible intercom and access apparatus 30. As set forth above, the code or generated tones (hereinafter, collectively "tones") may indicate that the visitor is authorized for entry to the building or property or indicate that the visitor is not authorized for entry to the building or property. Further, the tones may "trigger" a series of further actions by the invisible intercom and access apparatus 30, as discussed hereinafter.

The invisible intercom and access apparatus 10 may be hosted on a server or may be cloud 32 hosted, for example. For example, the invisible intercom and access apparatus 10 may be a custom VoIP server.

As shown in FIG. 2, the invisible intercom and access apparatus 30 may communicate with one or more third party device 50. The one or more third party device 50 may include one or more of a door activation device 100, a gate activation device 105, a cellular relay device 110, a network relay device 115, a short message service (SMS) gateway device 120, an Internet protocol (IP) camera device 125, access control system software and/or device 130, a lighting device 135, an automation device 140, a loudspeaker device 145, an elevator control device 150, a digital assistant device 155, such as "OK Google" or Alexa, an Internet of Things (IoT) device 160, a Long Range Wide Area Network (LoRaWAN) device 165, a garage door device 170, an alarm system 175, a pedestrian gate 180, and/or an Artificial Intelligence (AI) device 185, for example. However, these are just examples of third party devices, and embodiments are not limited thereto. The AI device may be a camera that detects a vehicle, a person, or a license plate through AI which must be recognized first, before the invisible intercom and access apparatus may activate or be used (Dual Authentication before the device may be activated). The invisible intercom and access apparatus 30 may also communicate with presence sensor 60, discussed hereinafter, and display 65, if the display is electronic.

Referring to FIG. 3, when a visitor arrives at an access point of a building or property, such as access point 25 of FIG. 1, the visitor may call a specific number on a visitor device, such as visitor device 20 of FIG. 1 (S305). If the visitor arrives in a vehicle, for example, at a gate of a building or property, the visitor may remain secure in the vehicle during the phone call.

As discussed above, the visitor device may be any device capable of calling a designated or specific phone number. The specific phone number may be provided at the access point of the building or property. For example, the specific phone number may be provided on a display, such as display 65 of FIGS. 1 and 9A-9B. The display may be a sign posted at the access point of the property. Alternatively, the display may be a sign at or on a gate or door or other access point; a sign on a column at a gate or door or other access point; a pedestal with a sign on it at a gate or door or other access point; a pedestal with a housing at a gate or door or other access point, similar to a call box but instead of a button, it has a sign; a sign with a QR code, which may be scanned using the visitor device to automatically prompt the visitor device to input the specific number; a hologram or projector at a gate or door or other access point; a LED or digital sign at a gate or door or other access point; or a small monitor at a gate or door or other access point. Alternatively, the specific phone number may be provided in a text message from an APoC to a visitor/visitor device; in a text message from a user portal to a visitor/visitor device; in an email from the user portal; or in response to detection of a visitor by a motion or presence sensor with an audible message including instructions. However, these are merely examples, and embodiments are not limited thereto.

The invisible intercom and access apparatus, such as invisible intercom and access apparatus 30 of FIG. 1, may receive the phone call from the visitor device and connect the phone call to one or more APoC device(s), such as one or more APoC device(s) 40 having input 42 of FIG. 1 (S310). The invisible intercom and access apparatus may determine whether the APoC answers the phone call (S311). If the APoC answers the phone call, the APoC may then press a code that produces a tone or tones on the input of the APoC device (S315), which the invisible intercom and access apparatus recognizes (S320). As previously discussed, the code may be a number or a series of numbers, such as #1, input at the input of the one or more APoC device. The input number or series of numbers creates DTMF tones. The invisible intercom and access apparatus recognizes the tones. If the tones indicate that the visitor is authorized for entry (S325), the invisible intercom and access apparatus may send a control signal to one or more third party device, such as one or more third party device 50 of FIG. 1 (S330). At this time, the APoC may request that the visitor stay on the line for conversation, further instructions, security, and/or destination confirmation, for example.

As discussed above, the one or more third party device may include one or more of a door activation device, a gate activation device, a cellular relay device, a network relay device, a SMS gateway device, an IP camera device, access control system software and/or device, a lighting device, an automation device, a loudspeaker device, an elevator control device, a digital assistant device, such as "OK Google" or Alexa, an IoT device, a LoRaWAN device, a garage door device, an alarm system, a pedestrian gate, and/or an AI device, for example. However, these are just examples of third party devices and embodiments are not limited thereto.

If the visitor is authorized for entry, the visitor and/or APoC may hang up or may stay on the line so that the visitor may receive further directions/instructions while in the building or on the property or provide peace of mind while they arrive to their final destination. In the event the visitor is entering a building or property that requires a second door or an elevator to gain entry, staying on the line will allow the authorized person to also unlock that door or call the elevator to a specific floor all while on the same call. According to embodiments, the invisible intercom and access system may receive confirmation of triggered events, as well as door opened/closed status, call logging, and other features may be logged.

If the tones indicate that the visitor is denied entry (S325), the invisible intercom and access apparatus may send a message to the visitor device indicating that entry is denied (S335).

If the APoC does not answer the phone call or misses the phone call (S311), the APoC may call the specific or designated phone number using the APoC device (S313) in response to a notification, such as a SMS or text message, sent by the invisible intercom and access apparatus to notify the APoC of the missed phone call (S312). The APoC may then input the code producing tones into the APoC device (S315).

Alternatively, the APoC may enter a code into input 42, or merely respond "YES" in response to the SMS or text message. The invisible intercom and access apparatus may recognize the code or the response of "YES" or any "like" pre-configured response word SMS or text message reply from the APoC device to initiate an action from the invisible intercom and access apparatus such as but not limited to reconnecting the APoC call to the visitor and control or send a control signal to one or more third party device. The APoC may also call the designated phone number and the invisible intercom and access apparatus may reconnect with the missed visitor, or the APoC may call the visitor back him or herself. If the missed visitor has left the access point location, he or she may stay on the invisible intercom and access apparatus connected line until the visitor reaches the access point location and then the APoC may authorize access via tones or other methods.

Further, alternatively to connecting the phone call from the visitor to the APoC, the invisible intercom and access apparatus may accept and allow responses to an SMS or text message to the APoC device from the visitor. The APoC may enter a code into input 42, or merely respond "YES" or any "like" pre-configured response word SMS or Text message reply. The invisible intercom and access apparatus may recognize the code or the response of "YES" and control or send a control signal to one or more third party device.

Referring to FIG. 2, the invisible intercom and access apparatus may be in communication with and control various third party devices. As set forth above, the one or more third party device may include one or more of a door activation device, a gate activation device, a cellular relay device, a network relay device, a SMS gateway device, an IP camera device, access control system software and/or device, a lighting device, an automation device, a loudspeaker device, an elevator control device, a digital assistant device, such as "OK Google" or Alexa, an IoT device, a LoRaWAN device, a garage door device, an alarm system, a pedestrian gate, and/or an AI device, for example. Further, the invisible intercom and access apparatus may be in communication with and control a display, if the display is an electronic display or monitor, or a presence sensor. The invisible intercom and access apparatus may be configured or programmed to respond to and/or receive responses and/or to control each of these devices via their own respective protocols to gain feedback, for example, a vehicle in a presence zone or allowed to send open command, and/or perform a function, for example, open the gate. Generally, the intended function will be in response to recognized tones, that is, the code input by the APoC into the one or more point of contact device.

FIG. 4 is an invisible intercom and access method according to another embodiment. This method is similar to the previous embodiment. However, in this embodiment, a visitor may remain on the phone call, that is, remain on the line, to be guided by an APoC through multiple access points or to final destination.

Referring to FIG. 4, when a visitor arrives at an access point (first access point) of a building or property, such as access point 25 of FIG. 1, the visitor may call a specific number on a visitor device, such as visitor device 20 of FIG. 1 (S405). If the visitor arrives in a vehicle, for example, at a gate of a building or property, the visitor may remain in the vehicle during the phone call.

As discussed above, the visitor device may be any device capable of calling a designated or specific phone number. The specific phone number may be provided at the access point of the building or property. For example, the specific phone number may be provided on a display, such as display 65 of FIGS. 1 and 9A-9B. The display may be a sign posted at the access point of the property. Alternatively, the display may be a sign at or on a gate or door or other access point; a sign on a column at a gate or door or other access point; a pedestal with a sign on it at a gate or door or other access point; a pedestal with a housing at a gate or door or other access point, similar to a call box but instead of a button, it has a sign; a sign with a QR code, which may be scanned using the visitor device to automatically prompt the visitor device to input the specific number; a hologram or projector at a gate or door or other access point; a LED or digital sign at a gate or door or other access point; or a small monitor at a gate or door or other access point. Alternatively, the specific phone number may be provided in a text message from an APoC to a visitor/visitor device; in a text message from a user portal to a visitor/visitor device; in an email from the user portal; or in response to detection of a visitor by a motion or presence sensor with an audible message including instructions. However, these are merely examples, and embodiments are not limited thereto.

The invisible intercom and access apparatus, such as invisible intercom and access apparatus 30 of FIG. 1, may receive the phone call from the visitor device and connect the phone call to one or more APoC device(s), such as one or more APoC device(s) 40 having input 42 of FIG. 1 (S410). The APoC may then press a code that produces a tone or tones on the input of the APoC device (S415), which the invisible intercom and access apparatus recognizes (S420). The code may be associated with the access point, that is, a first access point. As previously discussed, the code may be a number or a series of numbers, such as #1, input at the input of the one or more APoC device. The input number or series of numbers creates DTMF tones. The invisible intercom and access apparatus recognizes the tones. If the tones indicate that the visitor is authorized for entry at the first access point (S425), the invisible intercom and access apparatus may send a control signal to one or more third party device, such as one or more third party device 50 of FIG. 1, associated with the first access point (S430). At this time, the APoC may request that the visitor stay on the line (S440) for conversation, further instructions, security, and/or destination confirmation, for example.

As discussed above, the one or more third party device may include one or more of a door activation device, a gate activation device, a cellular relay device, a network relay device, a SMS gateway device, an IP camera device, access control system software and/or device, a lighting device, an automation device, a loudspeaker device, an elevator control device, a digital assistant device, such as "OK Google" or Alexa, an IoT device, a LoRaWAN device, a garage door device, an alarm system, a pedestrian gate, and/or an AI device, for example. However, these are just examples of third party devices and embodiments are not limited thereto.

If the visitor is authorized for entry, the visitor and/or APoC may stay on the line so that the visitor may receive further directions/instructions while in the building or on the property or provide peace of mind while they arrive to their final destination. In the event the visitor is entering a building or property that requires a second door or an elevator to gain entry, staying on the line will allow the authorized person to also unlock that door or call the elevator to a specific floor all while on the same call. According to embodiments, the invisible intercom and access system may receive confirmation of triggered events, as well as door opened/closed status, call logging, and other features may be logged.

If the tones indicate that the visitor is denied entry (S425), the invisible intercom and access apparatus may send a message to the visitor device indicating that entry is denied at the first access point (S435).

If the visitor hangs up (S440), the phone call ends. If the visitor remains of the line (S440), the visitor may verbally confirm when he or she reaches a second access point (S445), such as a front door of a home (following gated entry), a door of a building (following garage entry), or an elevator (following front door entry), for example. The APoC may then press a code that produces a tone or tones on the input of the APoC device associated with the second access point (S450), which the invisible intercom and access apparatus recognizes (S455). If the tones indicate that the visitor is authorized for entry at the second access point, the invisible intercom and access apparatus may send a control signal to one or more third party device associated with the second access point (S465). If the tones indicate that the visitor is denied entry (S460), the invisible intercom and access apparatus may send a message to the visitor device indicating that entry is denied at the second access point (S470). One of ordinary skill in the art will recognize that the method may repeat until the visitor reaches his or her final destination or until the visitor reaches at access point through which he or she is not authorized to enter.

FIG. 5 is an invisible intercom and access method according to another embodiment. This method is similar to previous embodiments. However, in this embodiment, access points are each assigned a specific or designated phone number.

Referring to FIG. 5, when a visitor arrives at a first access point of a building or property, such as access point 25 of FIG. 1, the visitor may call a first specific number on a visitor device, such as visitor device 20 of FIG. 1 (S505). If the visitor arrives in a vehicle, for example, at a gate of a building or property, the visitor may remain in the vehicle during the phone call.

As discussed above, the visitor device may be any device capable of calling a designated or specific phone number. The specific phone number may be provided at the access point of the building or property. For example, the specific phone number may be provided on a display, such as display 65 of FIGS. 1 and 9A-9B. The display may be a sign posted at the access point of the property. Alternatively, the display may be a sign at or on a gate or door or other access point; a sign on a column at a gate or door or other access point; a pedestal with a sign on it at a gate or door or other access point; a pedestal with a housing at a gate or door or other access point, similar to a call box but instead of a button, it has a sign; a sign with a QR code, which may be scanned using the visitor device to automatically call the specific number; a hologram or projector at a gate or door or other access point; a LED or digital sign at a gate or door or other access point; or a small monitor at a gate or door or other access point. Alternatively, the specific phone number may be provided in a text message from an APoC to a visitor/visitor device; in a text message from a user portal to a visitor/visitor device; in an email from the user portal; or in response to detection of a visitor by a motion or presence sensor with an audible message including instructions. However, these are merely examples, and embodiments are not limited thereto.

The invisible intercom and access apparatus, such as invisible intercom and access apparatus 30 of FIG. 1, may receive the phone call from the visitor device and connect the phone call to one or more APoC device(s), such as one or more APoC device(s) 40 having input 42 of FIG. 1 (S510). The APoC may then press a code that produces a tone or tones on the input of the APoC device (S515), which the invisible intercom and access apparatus recognizes (S520). The code may be associated with the first access point. As previously discussed, the code may be a number or a series of numbers, such as #1, input at the input of the one or more APoC device. The input number or series of numbers creates DTMF tones. The invisible intercom and access apparatus recognizes the tones. If the tones indicate that the visitor is authorized for entry at the first access point (S525), the invisible intercom and access apparatus may send a control signal to one or more third party device, such as one or more third party device 50 of FIG. 1, associated with the first access point (S530).

As discussed above, the one or more third party device may include one or more of a door activation device, a gate activation device, a cellular relay device, a network relay device, a SMS gateway device, an IP camera device, access control system software and/or device, a lighting device, an automation device, a loudspeaker device, an elevator control device, a digital assistant device, such as "OK Google" or Alexa, an IoT device, a LoRaWAN device, a garage door device, an alarm system, a pedestrian gate, and/or an AI device, for example. However, these are just examples of third party devices and embodiments are not limited thereto.

If the visitor is authorized for entry, the visitor and/or APoC may stay on the line so that the visitor may receive further directions/instructions while in the building or on the property or provide peace of mind while they arrive to their final destination. In the event the visitor is entering a building or property that requires a second door or an elevator to gain entry, staying on the line will allow the authorized person to also unlock that door or call the elevator to a specific floor all while on the same call. According to embodiments, the invisible intercom and access system may receive confirmation of triggered events, as well as door opened/closed status, call logging, and other features may be logged.

If the tones indicate that the visitor is denied entry (S525), the invisible intercom and access apparatus may send a message to the visitor device indicating that entry is denied at the first access point (S535).

The visitor may proceed through the first access point, and then may continue to a second access point. At the second access point, such as a front door of a home (following gated entry), a door of a building (following garage entry), or an elevator (following front door entry), for example, the visitor may call a second specific phone number associated with the second access point (S445).

The invisible intercom and access apparatus may receive the phone call from the visitor device and connect the phone call to one or more APoC device(s) (S546). The APoC may then press a code that produces a tone or tones on the input of the APoC device associated with the second access point (S550), which the invisible intercom and access apparatus recognizes (S555). If the tones indicate that the visitor is authorized for entry at the second access point, the invisible intercom and access apparatus may send a control signal to one or more third party device associated with the second access point (S565). If the tones indicate that the visitor is denied entry (S560), the invisible intercom and access apparatus may send a message to the visitor device indicating that entry is denied at the second access point (S570). One of ordinary skill in the art will recognize that the method may repeat until the visitor reaches his or her final destination or until the visitor reaches at access point through which he or she is not authorized to enter.

FIG. 6 is an invisible intercom and access method according to another embodiment. Referring to FIG. 6, when a visitor arrives at an access point of a building or property, such as access point 25 of FIG. 1, the visitor may call a specific number on a visitor device, such as visitor device 20 of FIG. 1 (S605). The designated or specific number may be displayed or provided as discussed above. The invisible intercom and access apparatus, such as invisible intercom and access apparatus 30 of FIG. 1, may receive the phone call from the visitor device and instead of forwarding the phone call, the invisible intercom and access apparatus may forward an SMS or text message to one or more APoC device(s), such as one or more APoC device(s) 40 having input 42 of FIG. 1 (S606). In response to the SMS or text message, the APoC may enter a code into input 42, or merely respond "YES" or any "like" pre-configured response word SMS or Text message reply (S616), which the invisible intercom and access apparatus recognizes (S621). If the code indicates that the visitor is authorized for entry or is the response "YES" (S625), the invisible intercom and access apparatus may send a control signal to one or more third party device, such as one or more third party device 50 of FIG. 1 (S630). If the code indicates that the visitor is not authorized for entry or the answer is "NO", the invisible intercom and access apparatus may send a message to the visitor device indicating that entry is denied (S635).

FIG. 7 is an invisible intercom and access method according to another embodiment. Referring to FIG. 7, when a visitor arrives at an access point of a building or property, such as access point 25 of FIG. 1, the visitor may send an SMS or text message, such as but not limited to "I'm here" to a specific number on a visitor device, such as visitor device 20 of FIG. 1 (S705). The designated or specific number may be displayed or provided as discussed above. The invisible intercom and access apparatus, such as invisible intercom and access apparatus 30 of FIG. 1, may receive the SMS or text message, such as but not limited to "I'm here" from the visitor device and the invisible intercom and access apparatus may forward an appropriate SMS or text message, such as but not limited to "visitor phone number/caller says "I'm here", reply "YES to open the access point" or "NO to deny entry" to one or more APoC device(s), such as one or more APoC device(s) 40 having input 42 of FIG. 1 (S706). In response to the SMS or text message, the APoC may enter a code into input 42, or merely respond "YES" or any "like" pre-configured response word SMS or text message reply (S716), which the invisible intercom and access apparatus recognizes (S721). If the code indicates that the visitor is authorized for entry or is the response "YES" (S725), the invisible intercom and access apparatus may send a control signal to one or more third party device, such as one or more third party device 50 of FIG. 1 (S730). If the code indicates that the visitor is not authorized for entry or the answer is "NO", the invisible intercom and access apparatus may send a message to the visitor device indicating that entry is denied (S735).

Moreover, the invisible intercom and access apparatus 30 according to embodiments may be programmed to have various functions. For example, if a pre-approved number is recognized by the invisible intercom and access apparatus 30, the invisible intercom and access apparatus 30 may automatically trigger an action based on caller id recognition, such as open a gate or door. Optionally, if a pre-approved number is recognized by the invisible intercom and access apparatus 30, the invisible intercom and access apparatus 30 may ask for a PIN, and based on caller ID recognition and the PIN, trigger an action, such as open a gate or door. Optionally, the invisible intercom and access apparatus 30 may reply to a caller/visitor with a message stating that the system has recognized his or her phone number, and: "Would you like us to contact the last resident you were here to see?" If the caller/visitor answers yes, the invisible intercom and access apparatus 30 may automatically route the phone call to the previously APoC (great for a family member or friend). If the caller/visitor answers no, the invisible intercom and access apparatus 30 may direct the caller/visitor to a main menu so that the caller/visitor may contact a different APoC (great for pizza delivery or package deliver, for example).

Optionally, if a pre-defined number is recognized by the invisible intercom and access apparatus 30, the invisible intercom and access apparatus 30 may deny the phone call. An APoC may block an unwanted guest from contacting him or her or entering the building or property, and/or send the unwanted guest a text message with further pertinent information about why his or her phone call was denied, or he or she was denied entry to the building or property.

Once an incoming phone call is detected by the invisible intercom and access apparatus 30, a pre-alert text may be sent to the one or more APoC with a message stating that he or she has a visitor about to contact him or her, and from what access point the visitor is calling (for example, the front gate). Additional details, such as caller ID details, contact information details, type of phone details, and any other generally available detail may be provided. Optionally, upon calling the specific phone number, a visitor may hear a welcome message custom to a building or property, and/or receive a voice message, such as: "All calls and activity on this line/system are recorded for security purposes." The visitor may be required to provide information, such as state his or her name, state the reason he or she is visiting, and/or state at what access point he or she is located, for example. To state at what access point he or she is located, a voice or numbered selection may be provided. For example, the system may ask: "At what gate are you located? The front gate or the back gate?". In the event there are two or more APoC with the same name, an option may be provided to decide which one by number selection or verbal selection. For example, the system may ask: "I see there are two David White's that live at this property. Would you like to contact David White who lives in building 1 or David White who lives in building 2?".

When the one or more APoC receives a phone call from the specific phone number associated with the one or more access point, the one or more APoC may be informed in advance by a pre-alert text message. The invisible intercom and access apparatus 30 may determine via caller ID from what access point the phone call originates, from what group of access points the phone call originates, and/or from what property the phone call originates, for example. Upon answering the phone call, the visitor may be directly connected to the APoC. The invisible intercom and access apparatus 30 may provide details, such as who is calling via caller ID, and/or from what access point the visitor is calling. A recording of visitor information may be gathered and stored. Based on these details, the APoC may accept the phone call or deny the phone call.

Upon accepting the phone call, the APoC may communicate with the visitor and verify his or her identity. The invisible intercom and access apparatus 30 may pass through two way audio from the visitor device 20 to the one or more APoC 40 and vice versa.

To grant access, the APoC may press the code on the one or more APoC device 40. As set forth above, the code may be a number or series of numbers, such as "1", which creates a tone or tones. The APoC will know in advance what key(s) to press on the APoC device 40, for example, on their phone, to trigger a specific action. Optionally, the APoC may be taken to an automated attendant with options he or she may select if it is a large or more complex site.

The invisible intercom and access apparatus 30 may listen for the tones while the phone call is active. Any visitor DTMF tones will only allow the visitor to navigate to the APoC except for other features or other functions discussed herein. Tones from the APoC may trigger actions to take to proceed, additional navigation options, and/or denial of a call, for example.

The invisible intercom and access apparatus 30 has a wide range of trigger actions, all of which may result from simple tones being received from an APoC. Trigger actions may be facilitated by, for example, a SMS message, a Multimedia Message Service (MMS) message, an email, phone call, automated message, Hypertext Transfer Protocol Secure (HTTP/S) message, an Application Programming Interface (API) message, a MXMessagingSystem message, and/or any other third party programming language supporting messages, such as OK Google, and hey Alexa, for example. A trigger action portal may be provided and incorporate security features as deemed appropriate for hardware/software communication. The trigger action portal may be a page in the user portal which allows for configuration setup and changes to be made via a web browser. Each trigger action will either send a control signal to a dedicated hardware device (third party device) connected to the one or more access point or send a control signal to a software or platform which has the ability to control the dedicated hardware device (third party device) connected to the one or more access point.

The type of hardware or software being used will determine the type of command needed/used. For example, the hardware may include Global System for Mobiles (GSM) Routers, a GSM Gateway with input/output; an IP camera; a network input/output device; software; any access control system, such as ICT Protégé GX, which will support message commands and in turn command connected hardware; video management software which will support message commands and in turn command connected hardware; and/or any form of Structure Query Language (SQL), which connects to a database which can connect to software or hardware for commands to be performed. Typical commands may include an unlock function, lock function, open function, hold open function, close function, activate function, deactivate function, and/or other functions relating to access as appropriate, for example; however, embodiments are not limited hereto.

Upon successful activation of a triggered action, the one or more access point may be unlocked/opened and the visitor may enter the building or property. The invisible intercom and access apparatus 30 may acknowledge an act of successful activation from a triggered action for the APoC by, for example, a tone; a message, such as "access granted"; or a message, such as "you have successfully opened front gate", or may include no message or tone at all. The act of successful activation from a triggered action for the visitor may include the gate or door opening; a card reader at the gate or door may change color/beep indicating access; or a lock may make a noise indicating the visitor may enter, for example. The visitor may be granted access and be able to enter the building or property, by, for example, walking, driving, or other means.

Upon activation or unlocking of an access point, several more actions may follow. If the door/gate status is monitored, the event of the door/gate opening may be logged by the invisible intercom and access apparatus 30. Item logging may include functions, such as door/gate opened, door/gate closed, door/gate secured, door/gate unsecured, for example. Just like triggered actions may be activated, the invisible intercom and access apparatus 30 may receive responses as a result of those triggered actions. Triggered action responses or event collection from the hardware and/or software may also be happening. Logging of this information is important and may be supplied for configuration purposes, may be displayed to the APoC, may be pushed to third party devices and systems, and/or may be used to trigger another action, for example.

As previously noted, the visitor and/or APoC may hang up or may stay on the line so that the visitor may receive further directions while in the building or on the property or provide peace of mind while he or she arrives to his or her final destination. Upon hanging up, the phone call and connection from the visitor device 20 to the APoC device 40 may be terminated. The APoC may receive a text stating that the visitor was granted access to the access point. The visitor may receive a text stating he or she has been authorized to enter the building or property.

If the visitor wants or needs further assistance to proceed to his or her destination, the APoC may remain on the phone call and continue communication until the visitor arrives essentially at his or her final destination. This is useful, for example, in unfamiliar properties, an office building; for the elderly or the directionally challenged; or anyone requiring a direct path to the APoC in the building or property.

In the event a visitor is entering a building or property that requires a second door or an elevator to gain entry, staying on the line may allow the APoC to also unlock the second door or call the elevator to a specific floor all while remaining on the same phone call. This may be performed by having multiple control relays by independent tones relating to a specific relay output, which may be controlled when it is appropriate to control them by the APoC, one at a time at a specific time in the APoC's control. The invisible intercom and access apparatus 30 is very secure, prevents unwanted tailgating from unwanted people coming in behind a visitor or waiting in a lobby for the visitor to enter the elevator which was just unlocked. Further, remaining on the phone call may also enhance security of the visitor as he or she is in communication with someone in the building or property. He or she may also reach his or her destination quicker, request assistance, if needed, and/or alert someone on site potentially if they are in danger or concerned, for example.

FIG. 8 is a schematic diagram illustrating an invisible intercom and access method according to an embodiment. When a visitor A arrives at an access point of a building or property, the visitor may make a phone call (1) to a designated or specific phone number using visitor device 20, such as a mobile phone. A cell tower B may receive the phone call/signal (1) and relay the phone call/signal (2) to a mobile phone switching office C. The phone call/signal (3) may be routed to invisible intercom and access apparatus 30 hosted on cloud server D creating a first connection. The invisible intercom and access apparatus 30 may then connect the phone call (4/7/10) to APoC device 40 of an APoC (G/J/L) through public switch telephone network (PSTN) E (4-E-5-F-6-G) and/or through cellular network H (7-H-8-I-9-J) and/or through any other network type phone or communication protocol (10-K-11-L). The first APoC G, J or H to answer may communicate to the visitor A. Once the invisible intercom and access apparatus 30 connects the phone call, button presses by the APoC producing tones may instruct the invisible intercom and access apparatus 30 to trigger an action via several connection protocols at one or more third party device 50, such as device M that performs an action, such as unlocking door or gate N. The only onsite hardware required is an appropriate control device.

Figure 9A:
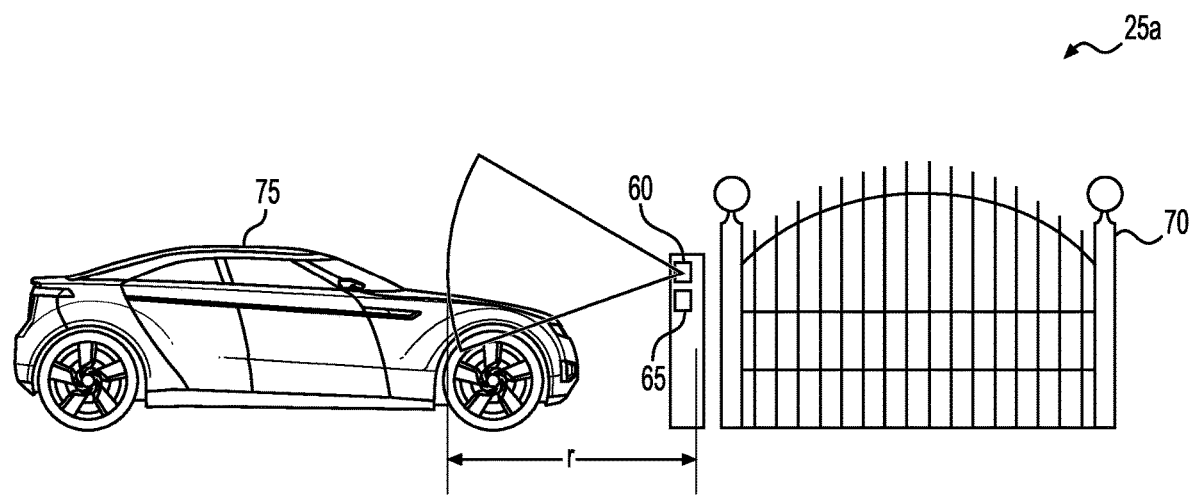
FIGS. 9A-9B are schematic diagrams illustrating use of a presence sensor at an access point of a building or property to detect a visitor according to embodiments.
Figure 9B:
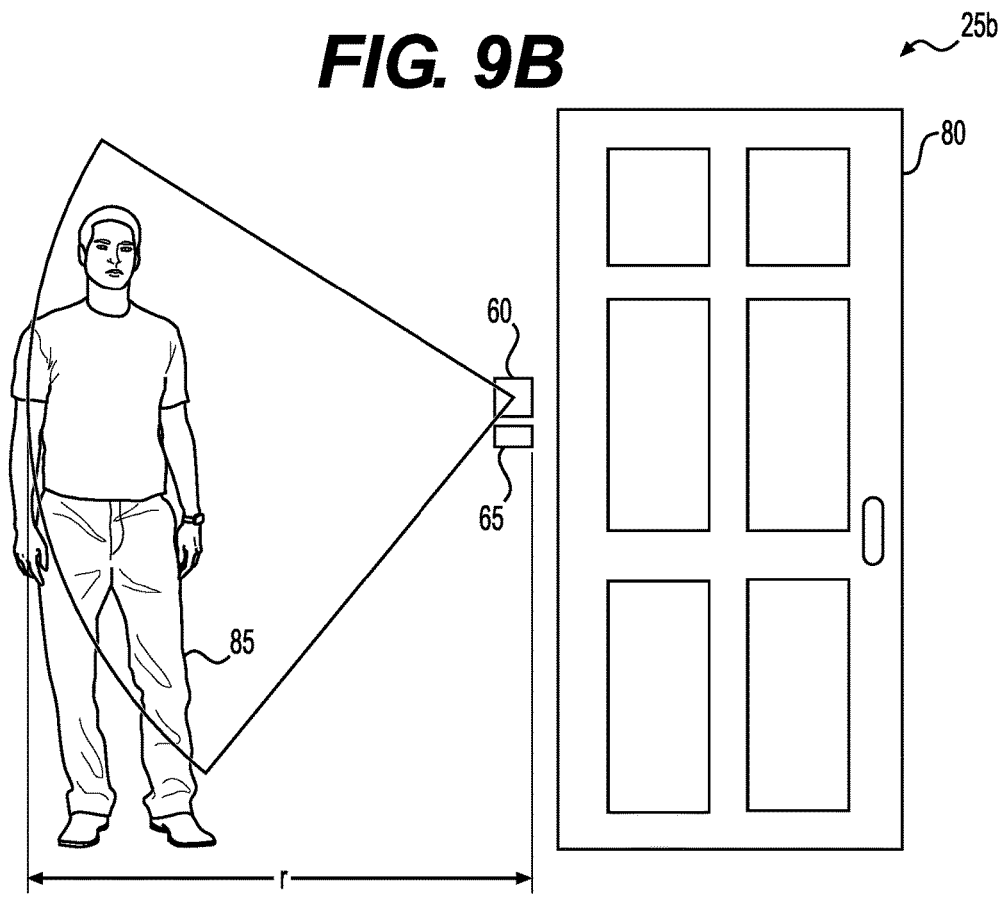

FIGS. 9A-9B are schematic diagrams illustrating use of a motion or presence sensor at an access point of a building or property to detect a visitor according to embodiments. Motion or presence sensor (hereinafter "presence sensor") 60 may be provided at an access point of a building or property 25a, 25b. For example, presence sensor 60 may be provided at gate 70 to detect visitor vehicle 75 or a visitor within detection range r, as shown in FIG. 9A, or may be provided at door 80 to detect visitor 85 within detection range r, as shown in FIG. 9B. When a phone call from visitor device 20 is received by the invisible intercom and access apparatus 30, the invisible intercom and access apparatus 30 may determine whether visitor 85 or visitor vehicle 75 is within the detection zone r of the presence sensor 60. If presence is detected, the invisible intercom and access apparatus 30 may connect the phone call to one or more APoC device(s) 40. If presence is not detected, the invisible intercom and access apparatus 30 may send a message to the visitor device 20 indicating that the visitor 85 must be within the detection range r and/or forward other instructions, and/or denying entry to the visitor 85, for example.

The invisible intercom and access system and method according to embodiments are phone-based for a visitor to gain access. This provides benefits both in terms of cost and expanded capabilities. A visitor may continue talking to an APoC until he or she reaches a final destination. Current call boxes do not offer this because a visitor has to physically walk away from/leave the call box. This can also provide a level of safety and security as the visitor is on the phone with the APoC the entire time potentially keeping them safe and guided to their destination. Further, there is no expensive hardware to install, no trenching, no local phone lines, and/or no Internet service required. It is literally an inexpensive "call box" solution. Visitors may gain access to any gate or door anywhere where lack of wiring or networking makes it costly and/or impossible to achieve, such as utility closets, storage rooms, off-site maintenance stations, and/or other unmanned remote sites with gates and doors, for example. The invisible intercom and access system and method according to embodiments also provides germ free access. The invisible intercom and access system and method according to embodiments are scalable from a single family home to any size office building, industrial site, or utility company with dozens of off-site unmanned locations that are gated for security.

The invisible intercom and access system and methods according to embodiments may route a phone call directly to an APoC/APoC device. This is particularly suitable for small-sized systems, such as a single property or home. Alternatively, the invisible intercom and access system and methods according to embodiments may route a phone call to an automated attendant with dial by number selections, for medium sized systems, or to an automated attendant with basic or advanced voice prompts, for large sized systems. The visitor and/or APoC may hang up or may stay on the line so that the visitor may receive further directions/instructions while in the building or on the property or provide peace of mind while they arrive to his or her final destination. In the event that the visitor is entering a building or property that requires a second door or an elevator to gain entry, staying on the line will allow the APoC to also unlock that door or call the elevator to a specific floor all while on the same phone call. The invisible intercom and access system and methods according to embodiments may receive confirmation of triggered events as well as door opened/closed status, call logging and other features may be logged.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An invisible intercom and access method, comprising:
   receiving via an invisible intercom and access apparatus a phone call from a visitor device using a specific phone number provided to a visitor at at least one access point of a building or property, the specific phone number being associated with the at least one access point of the building or property, wherein the specific phone number is used to access the invisible intercom and access apparatus, which is remote from the at least one access point of the building or property, and wherein the invisible intercom and access apparatus is one of hosted on a server or cloud hosted;
   connecting via the invisible intercom and access apparatus the phone call to one or more authorized point of contact device, the one or more authorized point of contact device having an input through which an authorized point of contact provides input to the one or more authorized point of contact device in response to the phone call;
   recognizing via the invisible intercom and access apparatus tones of a code input by the one or more authorized point of contact device; and
   controlling one or more third party device in response to the recognizing of the tones.

2. The invisible intercom and access method of claim 1, wherein the code comprises a number or series of numbers input into the input of the one or more authorized point of contact device and the recognizing via the invisible intercom and access apparatus comprises recognizing the tones of the number or series of numbers.

3. The invisible intercom and access method of claim 1, wherein the controlling of the one or more third party device comprises sending a control signal to the one or more third party device.

4. The invisible intercom and access method of claim 3, wherein the one or more third party device includes one or more of a gate activation device, a door activation device, a cellular relay device, a network relay device, a short message service (SMS) gateway device, an Internet protocol (IP) camera device, access control system software and/or device, a lighting device, an automation device, a loudspeaker device, an elevator control device, a digital assistant device, such as "OK Google" or Alexa, an Internet of Things (IoT) device, a Long Range Wide Area Network (LoRaWAN) device, a garage door device, an alarm system, a pedestrian gate, and/or an Artificial Intelligence (AI) device.

5. The invisible intercom and access method of claim 1, further comprising at least one of:
   displaying the specific phone number at the at least one access point of the building or property; or providing the visitor with the specific phone number at the at least one access point of the building or property via at least one of an audible message, a text message, email, or Quick Response code.

6. The invisible intercom and access method of claim 5, wherein the displaying of the specific phone number at the at least one access point of the property or building comprises displaying the specific phone number on a sign at or on a gate or door at the at least one access point; displaying the specific phone number on a sign on a column at a gate or door at the at least one access point; displaying the specific phone number on a pedestal with a sign at a gate or door at the at least one access point; displaying the specific phone number on a pedestal with a housing at a gate or door at the at least one access point; displaying the specific phone number on a hologram or projector at a gate or door at the at least one access point; displaying the specific phone number on a light emitting diode (LED) or digital sign at the at least one access point; or displaying the specific phone number on a small monitor at a gate or door at the at least one access point.

7. The invisible intercom and access method of claim 1, further comprising:
detecting via a presence sensor at least one of a visitor or a visitor vehicle at the at least one access point.

8. The invisible intercom and access method of claim 1, wherein the recognizing via the invisible intercom and access apparatus of the tones and controlling the one or more third party device comprise:
recognizing the tones as an authorization code; and
sending a control signal to the one or more third party device.

9. The invisible intercom and access method of claim 8, wherein the recognizing via the invisible intercom and access apparatus of the code comprises:
recognizing the tones as a denial code, and wherein the method further comprises sending a message to the visitor device denying access to the building or property.

10. The invisible intercom and access method of claim 1, wherein the visitor device comprises a mobile phone of a visitor arriving at the at least one access point of the building or property.

11. The invisible intercom and access method of claim 1, wherein the at least one access point comprises a plurality of access points of a building, property, or multiple properties.

12. The invisible intercom and access method of claim 1, wherein the receiving via the invisible intercom and access apparatus of the phone call from the visitor device using the specific phone number provided to the visitor at the at least one access point of the building or property comprises receiving via the invisible intercom and access apparatus a phone call from a visitor device using a first specific phone number associated with a first access point, wherein the recognizing via the invisible intercom and access apparatus of the tones of the code input by the one or more authorized point of contact device comprises recognizing via the invisible intercom and access apparatus tones of a code input by the one or more authorized point of contact device associated with the first access point, and wherein the controlling of the one or more third party device in response to the recognizing of the tones comprises controlling one or more third party device associated the first access point in response to the recognizing of the tones, and wherein the method further comprises:
receiving via the invisible intercom and access apparatus a phone call from a visitor device using a second specific phone number provided to a visitor at a second access point of the building or property;
connecting via the invisible intercom and access apparatus the phone call to one or more authorized point of contact device;
recognizing via the invisible intercom and access apparatus tones of a code input by the one or more authorized point of contact device associated with the second access point; and
controlling one or more third party device associated with the second access point in response to the recognizing of the tones.

13. The invisible intercom and access method of claim 1, wherein the at least one access point comprises a first access point and a second access point, wherein the receiving, connecting, recognizing, and controlling provide entry to the visitor through the first access point, and wherein the method further comprises:
upon notification that the visitor has arrived at a second access point, recognizing via the invisible intercom and access apparatus tones of a code input by the one or more authorized point of contact device associated with the second access point; and
controlling one or more third party device associated with the second access point in response to the recognizing of the tones.

14. The invisible intercom and access method of claim 1, wherein if one or more authorized point of contact associated with the one or more authorized point of contact device fails to answer the phone call, the method further comprises:
forwarding via the invisible intercom and access apparatus a short message service (SMS) message to the one or more authorized point of contact device informing the one or more authorized point of contact of the phone call.

15. The invisible intercom and access method of claim 14, wherein if the one or more authorized point of contact associated with the one or more authorized point of contact device calls the specific phone number in response to the SMS message, the method further comprises:
recognizing via the invisible intercom and access apparatus tones of a code input by the one or more authorized point of contact device; and
controlling one or more third party device in response to the recognizing of the tones.

16. The invisible intercom and access method of claim 14, wherein the method further comprises:
recognizing a code or response input by the one or more authorized point of contact device in response to the SMS message; and
controlling one or more third party device in response to the code or response.

17. The invisible intercom and access method of claim 1, wherein the one or more authorized point of contact device comprises a device configured to receive a phone call and pressing numbers on the input, the input being one of a dial, a keypad, a touch pad, or clickable button.

18. The invisible intercom and access method of claim 1, wherein the one or more authorized point of contact device comprises a mobile phone, a landline phone, a Voice over Internet Protocol (VoIP) phone, a Session Initiation Protocol (SIP) or WebRTC softphone, or a mobile application ("app").

19. An invisible intercom and access system, comprising:
a visitor device configured to make a phone call to a specific phone number, the specific phone number being associated with at least one access point of a building or property;
one or more authorized point of contact device configured to receive the phone call and having an input configured to receive a code that produces tones;
one or more third party device configured to control access to the at least one access point of the property or building; and
an invisible intercom and access apparatus configured to receive the phone call from the visitor device and connect the phone call to the one or more authorized point of contact device, recognize the tones of the code input at the one or more authorized point of contact device in response to the phone call, and control or send a control signal to the one or more third party device, wherein the specific phone number is used to access the invisible intercom and access apparatus, which is remote from the at least one access point of the building or property, and wherein the invisible intercom and access apparatus is one of hosted on a server or cloud hosted.

20. The invisible intercom and access system of claim 19, wherein the code comprises a number or series of numbers input into a keypad of the one or more authorized point of contact device, and wherein the invisible intercom and access apparatus is configured to recognize the tones of the number or series of numbers.

21. An invisible intercom and access system, comprising:
means for receiving a phone call from a visitor device using a specific phone number provided to a visitor at at least one access point of a building or property, the specific phone number being associated with the at least one access point of the building or property;
means for connecting the phone call to one or more authorized point of contact device, the one or more authorized point of contact device having an input through which an authorized point of contact provides input to the one or more authorized point of contact device in response to the phone call;
means for recognizing tones of a code input by the one or more authorized point of contact device; and
means for controlling one or more third party device in response to the recognizing of the tones, wherein the specific phone number is used to access the invisible intercom and access system, which is remote from the at least one access point of the building or property, and wherein the means for receiving the phone call from the visitor device, the means for connecting the phone call to the one or more authorized point of contact device, the means for recognizing the tones of the code input by the one or more authorized point of contact device, and the means for controlling the one or more third party device are one of hosted on a server or cloud hosted.

* * * * *

UNITED STATES PATENT AND TRADEMARK OFFICE
CERTIFICATE OF CORRECTION

| | | |
|---|---|---|
| PATENT NO. | : 11,973,896 B2 | Page 1 of 1 |
| APPLICATION NO. | : 17/501170 | |
| DATED | : April 30, 2024 | |
| INVENTOR(S) | : David Joel White | |

It is certified that error appears in the above-identified patent and that said Letters Patent is hereby corrected as shown below:

On the Title Page

Please delete item (73) as follows:
"(73) Assignee: LG ELECTRONICS INC., Seoul, (KR)"

Signed and Sealed this
Twenty-second Day of October, 2024

Katherine Kelly Vidal
*Director of the United States Patent and Trademark Office*